United States Patent
Jordan et al.

(10) Patent No.: US 6,427,208 B1
(45) Date of Patent: Jul. 30, 2002

(54) IMAGE FILE CHANGE CAPTURE METHOD AND APPARATUS

(75) Inventors: Robin D. Jordan; James L. Kroening, both of Dakota Dunes, SD (US)

(73) Assignee: Gateway, Inc., Poway, CA (US)

( * ) Notice: Subject to any disclaimer, the term of this patent is extended or adjusted under 35 U.S.C. 154(b) by 0 days.

(21) Appl. No.: 09/175,625

(22) Filed: Oct. 20, 1998

(51) Int. Cl.$^7$ .......................................... G06F 15/177
(52) U.S. Cl. ........................................ 713/1; 713/100
(58) Field of Search ............................... 713/1, 2, 100; 709/220, 221

(56) References Cited

U.S. PATENT DOCUMENTS

| | | | |
|---|---|---|---|
| 5,089,958 A | 2/1992 | Horton et al. | 395/575 |
| 5,421,009 A | 5/1995 | Platt | 395/600 |
| 5,423,000 A | * 6/1995 | Kimura et al. | 713/1 |
| 5,437,012 A | 7/1995 | Mahajan | 395/164 |
| 5,604,906 A | 2/1997 | Murphy et al. | 395/712 |
| 5,717,930 A | 2/1998 | Imai et al. | 395/712 |
| 5,742,829 A | 4/1998 | Davis et al. | 395/712 |
| 6,052,719 A | * 4/2000 | Bezanson et al. | 709/220 |
| 6,092,189 A | * 7/2000 | Fisher et al. | 713/1 |
| 6,098,097 A | * 8/2000 | Dean et al. | 709/220 |

OTHER PUBLICATIONS

Troke, L., "Configuration, Installation and Distribution—A structured approach to software distribution for client/server", *Share Europe AM93:2.2E)*, pp. 893–905 (Oct. 25, 1993). XP000619799.

* cited by examiner

Primary Examiner—Dennis M. Butler
(74) Attorney, Agent, or Firm—Rodney L. Lacy; Mark S. Walker; Schwegman Lundberg Woessner & Kluth

(57) ABSTRACT

Method and apparatus for monitoring the installation of a computer hardware or software component so as to be able to reconstruct the installation at a later time without requiring a re-installation by hand. The data command stream of an installation and any changes made to the files of the computer, including the creation or deletion of files, are monitored and recorded.

14 Claims, 1 Drawing Sheet

IMAGE FILE CHANGE CAPTURE METHOD AND APPARATUS

FIELD OF THE INVENTION

The present invention relates generally to the field of computer hardware and software installation, and more specifically to the monitoring and capture of computer hardware and software installation.

BACKGROUND OF THE INVENTION

Computer storage devices such as hard drives, diskette, CD-ROMS, removable storage including tape backups and so-called "zip" drives (manufactured by IOMEGA) have become increasingly larger, especially hard drives and other removable storage. As hard drives have increased rapidly in size, software and programs written for the computers on which the hard drives are used have also become larger and much more complex. With the advent of CD-ROMS and DVD, it has become possible to place even more complex, large files and programs onto a single CD for the loading of the program onto a computer hard drive. Since it has become so easy to load large programs on hard drives, the industry has seen rapid growth in the actual number and size of software programs stored on hard drives.

The process of installing new software, especially software that may not necessarily have been tested on the specific configuration of computer on which it is being installed, can require a large number of changes to the computer system. Not all of the changes made in a software installation may be compatible with the existing software configuration. Further, it may at some point be desirable to reinstall an entire configuration, whether to a new hard drive, or to the existing hard drive. The reasons for this type of reinstallation are varied, from cleaning up the configuration to reinstalling due to a device or even a full system failure.

In a network situation, where each computer on the network may be configured slightly differently, with a different hard drive manufacturer or capacity, and different other aesthetic settings, installation of software programs has become even more time consuming than ever. When a system administrator or other person is responsible for loading software programs onto network computers, the numbers of which may run well into the hundreds, it is time prohibitive to load the necessary software individually onto each computer. Further, each computer may have a core group of software programs, but individual users may also require different software packages. In the case of a standard installation, many actions must be repeated again and again. Often, many of the same software packages will be installed on multiple computers. In this case, the actions of the installer are repeated again and again. It is very time consuming to repeat the same actions over and over again for multiple computers.

In the case of an individual computer and an individual computer user, the installation of computer components such as software programs and hardware that often requires software support, a different time consuming process occurs. Often, the installation of software and/or hardware by an individual user is more time consuming than installation of software or hardware by a system administrator or technical support person because the individual installer does not have the same level of expertise in the installation processes of software and, especially, hardware.

When a full reinstallation needs to be completed, the system is generally reinitialized or partitioned, leaving a blank canvas on which to paint the new setup. Often, the reinstallation goal will be to return the new configuration to the same configuration as was present before the reconfiguration became necessary. The painstaking process for reinstallation will involve finding all of the original documentation and source media for the software to be installed, as well as the drivers and setup information for all hardware not recognizable by the computer configuration, operating system, or the like. Following this, the installation process involves individually reinstalling each program or hardware component one at a time.

A computer hardware or software installation involves the execution of a series of commands to install the component or software. These commands take the form of a data stream which performs certain actions on and to various files stored on the computer in a hard drive or other storage medium. Further, entire files may be created or deleted during an installation. The installation software or process creates the data stream of commands during the installation.

It would be desirable to increase the speed at which a repeated installation or a re-installation could be accomplished.

It would also be desirable to provide a way to more efficiently reinstall computer hardware and software.

SUMMARY OF THE INVENTION

The present invention overcomes the problems of the prior art by providing apparatus and method for capturing the changes made to a computer system during setup or installation of hardware and/or software, allowing reinstallation at a later time with a time savings over individual reinstallation.

An embodiment of a method for capturing changes to a computer configuration during installation of a new computer component such as hardware or software comprises monitoring the data command stream of the installation, recording any modifications made to files of the computer during the installation, including the creation or deletion of entire files, and creating a change file containing the data command stream of the installation and changes made to the operating files of the computer during the installation.

Another embodiment of the invention is a machine readable medium comprising machine readable instructions for causing a computer to perform a method comprising monitoring the data command stream of the installation, recording the modifications made to files of the computer during the installation, including the creation or deletion of entire files, and creating a change file containing the data command stream of the installation and changes made to the operating files of the computer during the installation.

An apparatus embodiment of the present invention for monitoring the installation of a computer component into a computer system comprises a monitor module and a write module, the modules working together to monitor the data command stream of an installation, to record the data stream, and to record any changes to any files on the computer, including the creation or deletion of entire files.

The apparatus embodiment of the present invention may be implemented in a computer system. Such computer systems typically include a computer having a monitor, a keyboard, a pointing device such as a mouse, a processor and memory, and some storage medium such as a hard drive or the like. Apparatus modules for monitoring the data command stream, and for recording the command stream and any changes made to files on the computer system, including the creation or deletion of entire files, and writing the changes to an image file change capture file for later retrieval and re-execution of the data command stream for re-installation of the software or hardware are further present in the system when embodying the present invention.

DESCRIPTION OF EMBODIMENTS

In the following detailed description of the embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Figure 1:
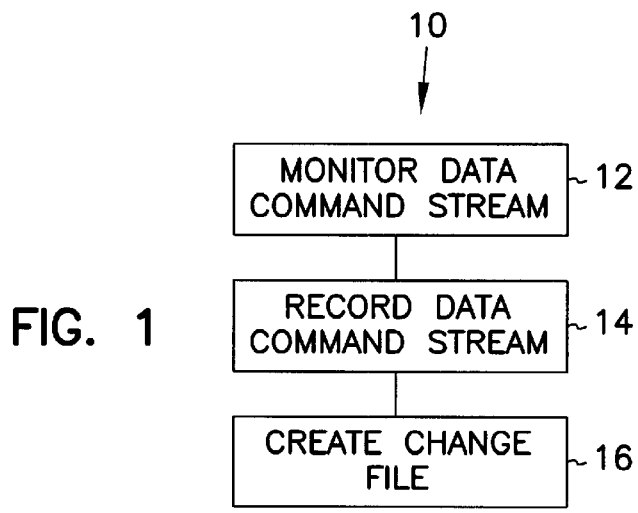
FIG. 1 is a flowchart diagram of an embodiment of the present invention.

Referring now to FIG. 1, an embodiment of a method 10 according to the present invention may be seen to comprise monitoring a data command stream of an installation process in block 12, recording the data command stream in block 14, and creating a change file in block 16. As the data command stream of a computer component software or hardware installation is generated by the installation process, the method 10 monitors the data command stream generated by the installation in block 12. This data command stream contains instructions to the computer on which the installation is being accomplished to perform certain actions on and to files, including adding information to files, deleting information from files, and creating and deleting entire existing files. Information may be added to or removed from many files on a computer during an installation, including the initialization files for the operating system or initialization files for the program itself.

Method 10 may be invoked or initiated manually prior to installation of a component, or may be automatically invoked during installation by an installation disk. Further, software embodying the method 10 may be running in the computing background, to become active upon the initiation of an installation program. For example, the software running in the background could become active when certain files are run, such as any files of the type install, setup, and the like. Further automatic initiation of the method may occur by a background task recognizing installation commands and then invoking method 10.

As the set of computer instructions, i.e. the data command stream, is generated by the installation of the component hardware or software, the actual data command stream is recorded in block 14. The recordation of the data command stream in block 14 allows for a later reconstruction of the actual commands of the installation process. This exact recording of the data command stream will allow the computer to re-execute the instructions of the installation process without undertaking the re-installation by hand. The process for re-installation of the component hardware or software is largely automated by the re-execution of the data command stream instructions of the original installation.

Multiple recordings of installations of different hardware and software components may be made in this fashion. If re-installation of some or all of the components of the computer system is required, the stored change file, containing both the changes made to the computer files, as well as the data command stream, allows the installation process to be repeated with a minimum of user interaction. The process is useful not only for re-installation of multiple files in an individual user situation such as the transfer of an operating system and programs to a new hard drive, but also for the installation of a core group of programs on multiple computers which are part of a larger network. Only one hand installation must be completed before the method 10 of the present invention allows a user to more fully automate the installation process for multiple installations of the same configuration.

In block 16, the method 10 creates a change file, which comprises the data command stream of the installation, information on files created or deleted during installation, and the information added to or deleted from existing files during the installation. The change file is stored on the hard disk of the computer, or on any other storage medium, such as a diskette, CD-ROM, removable media, tape unit, or the like.

Figure 2:
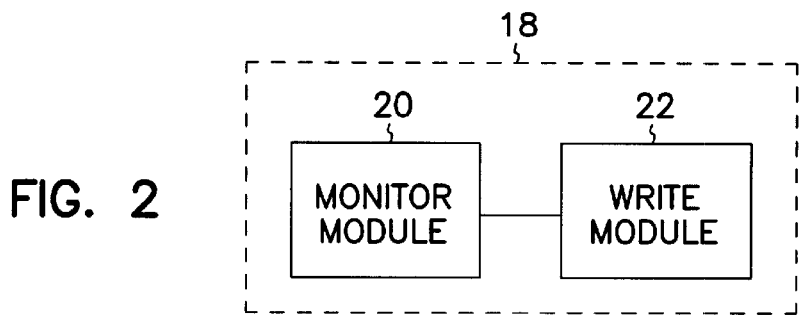
FIG. 2 is a block diagram of a representative apparatus embodiment of the present invention.

Referring now to FIG. 2, another embodiment 18 of the present invention comprises an apparatus for capturing the changes made to a computer system during installation of a computer component such as hardware or computer software. The apparatus 18 for capturing the changes made to the files on a computer system during installation of a component such as hardware or software comprises a monitor module 20 which monitors the data command stream of an installation as the installation takes place, and a write module 22 operatively connected to the monitor module 20 to receive information transferred from the monitor module 20 to the write module 22. The write module 22 records the data command stream and the actual changes made to the computer system concurrent with the installation. The recorded data and information is stored by a storage medium associated with the computer, such as the computer hard drive, diskette, or the like.

The monitoring and recording of the data command stream and the information on file changes, creations, and deletions occurs as the installation is taking place. The changes made to the computer system may include the modification of files by adding information to them or by deleting information from the, or by the creation or deletion of entire files. As each command from the data command stream is issued by the installation process, the monitor module 20 monitors all of the changes to the computer system, and sends information regarding the changes made to the write module 22. Write module 22 records both the data command stream and the actual changes made to files in the computer system, as well as the creation or deletion of entire files on the computer system storage (hard drive, diskette, et cetera). Once the installation process is complete, the write module causes the computer to store the information on changes made to the files, as well as file creation and deletion, to a storage medium as discussed above.

The image file change capture process described above in the various embodiments of the present invention may be implemented by computer programs of machine-executable instructions written in any number of suitable languages and stored on machine or computer readable media such as disk, diskette, RAM, ROM, or other device commonly included in a personal computer. The software embodying the present invention will be launched on command to capture the fall hand installation process of a computer component. The program places itself in the computing background and waits for the hand install process to start. The image file change capture process records the data stream of information as the installation program makes changes to the operating system dynamic files, the program files, or created or deletes entire files. At the completion of the installation, the capture recorder is closed and the image file change capture process creates a change file containing all of the monitored and recorded information regarding the installation.

The machine readable instructions of the machine readable embodiment of the present invention will allow the computer to detect the initiation of the data stream of an installation by detecting certain key words or data streams. Alternatively, the machine readable instructions could monitor the commands issued by the computer through the user or through programs on the computer. When a certain program name is invoked, the data stream recording will begin. For example, the machine readable instructions of the machine readable embodiment of the present invention could be written so as to activate the recordation of the data command stream upon the execution of a program having the name "install" or "setup" or the like.

Also, the end of the installation could be indicated by the user or by the installation program itself. The machine readable instructions of the machine readable embodiment of the present invention could be written so as to terminate the monitoring and recording of the data command stream upon the execution of certain key words common to the end of installation programs. Alternatively, the installation process could be indicated as done by the user, following which the machine readable embodiment of the present invention could be written to terminate.

Figure 3:
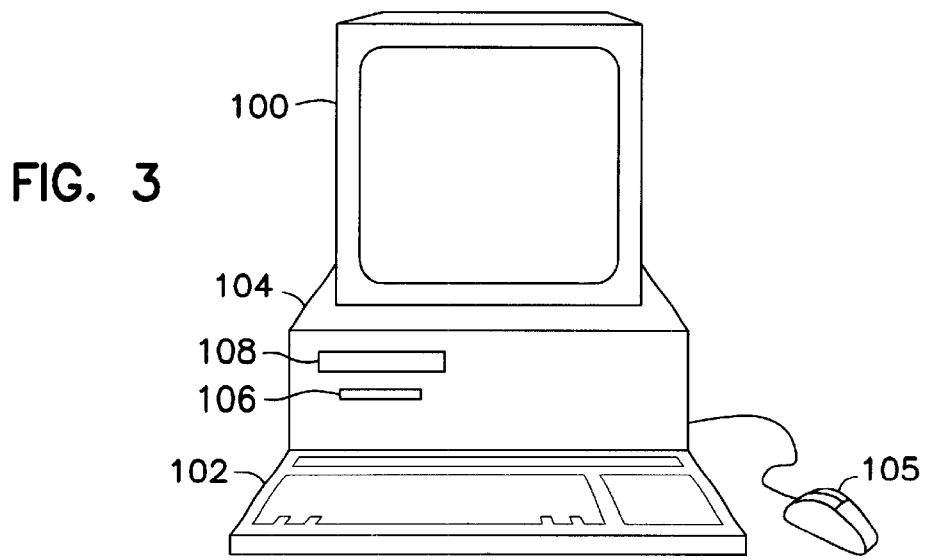
FIG. 3 is a block diagram of a typical computer configuration on which embodiments of the present invention may be used.

Personal computers, as shown in FIG. 3, typically include a monitor 100, keyboard input 102, central processing unit 104, and a pointing or selection device such as mouse 105. Further components of a typical computer system may include a machine readable storage media such as disk drive 106, hard disk, CD-ROM 108, DVD, modem, and the like. The processor unit of such a computer typically includes a microprocessor, memory (RAM and ROM), and other peripheral circuitry, not shown.

Method 10 and apparatus 18 in one embodiment comprise computer programs written to track the installation of software on personal computers as shown in FIG. 3. The computer programs run on the central processing unit 104 out of main memory, and may be transferred to main memory from permanent storage via disk drive 106 when stored on removable media or via a network connection or modem connection when stored outside of the personal computer, or via other types of computer or machine readable medium from which it can be read and utilized. The computer programs comprise multiple modules or objects to perform the method 10, or the functions of the modules in apparatus 18. The type of computer programming languages used to write the code may vary between procedural code type languages to object oriented languages. The files or objects need not have a one to one correspondence to the modules or method steps described depending on the desires of the programmer. Further, the method and apparatus may comprise combinations of software, hardware and firmware as is well known to those skilled in the art.

What is claimed is:

1. A method of capturing changes to a computer configuration during installation of a new computer component, comprising:

monitoring the data command stream and changes made to files of the computer during the installation;

recording the data command stream and the changes made to files of the computer during the installation; and creating a change file containing the data command stream of the installation and changes made to the files of the computer during the installation.

2. The method of claim 1, and further comprising:

detecting the beginning of the data command stream; and detecting the end of the data command stream.

3. The method of claim 1, wherein monitoring the data stream is initiated by a user.

4. The method of claim 1, and further comprising writing the change file to the computer for later retrieval.

5. A machine readable medium comprising machine readable instructions for causing a computer to perform a method comprising:

monitoring a data command stream and changes to files of the computer during the installation of a computer component;

recording the data command stream and the changes made to files of the computer during the installation; and creating a change file containing the data command stream of the installation and changes made to the files of the computer during the installation.

6. The machine readable medium of claim 5, and further comprising machine readable instructions for causing the computer to write the change file to a computer storage.

7. The machine readable medium of claim 5, and further comprising machine readable instructions for causing the computer to detect an end of the installation of the computer component.

8. The machine readable medium of claim 5, and further comprising machine readable instructions for causing the computer to detect an initiation of the data command stream of the installation.

9. Apparatus for monitoring the installation, using a data command stream, of a computer component into a computer system, comprising:

a monitor module which monitors the data command stream; and a write module operatively connected to the monitor module to record the data command stream and changes made to files of the computer system.

10. Apparatus as described in claim 9, wherein the monitor module begins monitoring in response to a command of a user.

11. A computer system capable of monitoring the installation of a computer component for later re-execution, comprising:

a computer having a memory;

a monitor module program loaded into the memory of the computer; and a write module program loaded into the memory of the computer, the write module program in data communication relation with the monitor module to receive data regarding changes made to the computer system during the installation of the computer component.

12. The computer system described in claim 11, wherein the monitor module program comprises a machine readable medium comprising machine readable instructions for causing the computer to monitor a data command stream of the installation.

13. The computer system described in claim 11, wherein the monitor module comprises a machine readable medium comprising machine readable instructions for causing the computer to record a data command stream of the installation and any changes made to files of the computer system during installation.

14. A machine readable medium having disposed thereon a data structure comprising a change file, generated by a set of machine readable instructions for monitoring of a data command stream of a component installation into a computer system, the change file comprising:

the data command stream; and information on a set of changes to files of the computer system made during the installation.

* * * * *